US008520842B2

(12) United States Patent
Nice et al.

(10) Patent No.: US 8,520,842 B2
(45) Date of Patent: Aug. 27, 2013

(54) MAINTAINING PRIVACY DURING USER PROFILING

(75) Inventors: Nir Nice, Kfar Veradim (IL); Ehud Wieder, Sunnyvale, CA (US); Boaz Feldbaum, Haifa (IL); Sefy Ophir, Tel Mond (IL); Eran Shamir, Atilt (IL); Yacov Yacobi, Mercer Island, WA (US); Arie Friedman, Petach-Tikva (IL)

(73) Assignee: Microsoft Corporation, Redmond, WA (US)

( * ) Notice: Subject to any disclaimer, the term of this patent is extended or adjusted under 35 U.S.C. 154(b) by 676 days.

(21) Appl. No.: 12/683,586

(22) Filed: Jan. 7, 2010

(65) Prior Publication Data
US 2011/0164746 A1 Jul. 7, 2011

(51) Int. Cl.
*H04L 29/06* (2006.01)
(52) U.S. Cl.
USPC .............................................. 380/30; 380/28
(58) Field of Classification Search
USPC ......... 380/28, 30; 726/4–6, 26–30; 713/185; 709/223–230
See application file for complete search history.

(56) References Cited

U.S. PATENT DOCUMENTS

| 4,218,582 | A | 8/1980 | Hellman et al. |
| 4,399,323 | A | 8/1983 | Henry |
| 7,164,765 | B2 | 1/2007 | Nishioka et al. |
| 2005/0010536 | A1* | 1/2005 | Cochran et al. ................. 705/76 |
| 2008/0148067 | A1* | 6/2008 | Sitrick et al. .................. 713/193 |
| 2009/0254971 | A1* | 10/2009 | Herz et al. ......................... 726/1 |
| 2010/0031335 | A1* | 2/2010 | Handler ............................ 726/8 |

OTHER PUBLICATIONS

SafeNet, "Addressing Issues of Data at Rest Privacy and Compliance with Strong Encryption and Authentication. How SafeNet's Data-at-Rest Protection Provides a Multi-Layered Solution", 13 pages, White Paper, Oct. 2006.
Bellare, et al., "Deterministic and Efficiently Searchable Encryption", 43 pages, Advances in Cryptology—Crypto '07 Proceedings, Lecture Notes in Computer Science, vol. 4622, pp. 535-552, A. Menezes ed., Springer, 2007, Depart. Computer Science & Engineering, Univ. California at San Diego; School of Computer Science, College of Computing, Georgia Institute of Technology, Atlanta GA; supported in part by NSF grants CNS-0524765, CNS-0627779, a gift from Intel Corporation; and supported in part by NSF Career award 0545659.
Chang, et al., "Privacy Preserving Keyword Searches on Remote Encrypted Data", 11 pages, Harvard University; http://eprint.iacr.org/2004/051.ps; Feb. 25, 2004.

(Continued)

*Primary Examiner* — Chau Le
(74) *Attorney, Agent, or Firm* — Shook Hardy & Bacon L.L.P.

(57) ABSTRACT

Systems, methods, and computer storage media having computer-executable instructions embodied thereon that maintain privacy during user profiling are provided. A profiling service receives, from a first device, rules for profiling a user. The rules were encrypted using a private key. The profiling service also receives, from a second device, user data. The user data was encrypted using a public key communicated to the second device by the first device. The profiling service then matches the encrypted rules with the encrypted user data, and based on the matching, generates a profile for the user. In embodiments, such a user profile can be utilized to deliver personalized digital content to a user.

20 Claims, 6 Drawing Sheets

(56) References Cited

OTHER PUBLICATIONS

D. Boneh, G. Di Crescenzo, R. Ostrovsky, and G. Persiano, "Public Key Encryption with Keyword Search," in proceedings of Curocrypt 2004, LNCS 3027, pp. 506-522, 2004, first posted Mar. 2004.
Alfredo Rial Duran, Universidad De Vigo, "Public-key Encryption with Oblivious Keyword Search. Priced Oblivious Transfer," Curso 2007-2008, 167 pages.

Zekeriya Erkin, Alessandro Piva, Stefan Katzenbeisser, R.L. Lagendijk, Jamshid Shokrallahi, Gregory Neven, and Mauro Barni, "Protection and Retrieval of Encrypted Multimedia Content: When Cryptography Meets Signal Processing," Hindawi Publishing Corporation, EURASIP Journal on Information Security, vol. 2007, Article ID 78943, 20 pages, accepted Dec. 30, 2007.

* cited by examiner

MAINTAINING PRIVACY DURING USER PROFILING

BACKGROUND

Personalized content delivery presents specific items of digital content to specific users. For instance, personalized advertisements, known as "targeted ads," deliver advertising deemed relevant to the interests of a target audience. Other instances of personalized content delivery include personalized webpages, personalized search results, or the like.

User profiling helps determine which items are most relevant when presenting personalized digital content to a specific user or group of users. Users are categorized into predetermined user profiles or segments based on a variety of types of user data.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention relate to maintaining privacy during user profiling. A profiling service receives one or more rules for profiling a user. The rules are encrypted using a private key. The profiling service also receives data from a user. The user data is encrypted using a public key. The profiling service generates a profile for a user based on matching the encrypted rules with the encrypted user data without the need to decrypt either the rules or the data.

BRIEF DESCRIPTION OF THE DRAWINGS

The present invention is described in detail below with reference to the attached figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention are generally directed to a method for maintaining privacy during user profiling. In this regard, user data is used to profile a user. As used herein, a user refers to one or more users that can be profiled by a profiling service. A user is designated by the term "U." A user may be a webpage user, such as an individual that navigates to a webpage or provides a user search query to a search engine and navigates a search results page. Alternatively, a user may be a group of users that have all navigated to the same or different webpages, or have entered the same or different search queries. Accordingly, user data refers to any number of items of data, including content generated by or associated with one or more users. Individual items of user data are referred to by the term "W." By way of example, user data may be data that is entered by or retrieved from a user. User data may include one item of data or multiple items of data, and may be from a single or multiple users. In embodiments, user data is a user's private information, such as, for example, search queries entered into a search engine by a user, documents opened or accessed by a user, emails received by a user, or the like. All items of user data, such as all data accessed or input by a user, may be treated as "private." As such, in some embodiments, there is no need to differentiate between which items of data are and are not "private."

To secure the privacy of user data during user profiling, the user data is encrypted. Encrypted user data is referred to as "$X_w$." In embodiments, the user data is encrypted using the Public Key Encryption with Keyword Search (PEKS) system. The PEKS system enables searching for keywords within encrypted user data, without revealing the content of the data. Throughout profiling, from receiving user data to matching and profiling a user, user data evaluated in the PEKS system remains encrypted.

User data is encrypted with a first key. A first key may be referred to as a "public key." As used herein, a public key refers to an encryption key that is known to a user. The public key is designated by the term "$K_{PUB}$." Items of user data (W) are encrypted (Enc) using the public key ($K_{PUB}$) and a random number (referred to as "r"), and designated as follows:

$$X_w = \text{Enc}(K_{PUB}, W, r)$$

Under the PEKS systems, a user may encrypt every item of user data with a different random number "r." By using the PEKS system to encrypt user data, the user data may be used to profile a user without viewing the content of the user's data itself. As such, user data is protected against decoding or decryption, and privacy is maintained during profiling.

It should be understood that additional or alternative steps may be taken to protect user privacy. For instance, privacy of the user data may be further protected by encrypting a data label for each item of user data, and keeping the value of the user data clear. By doing so, decrypting the data label itself would still not reveal the content of the original user data, but operations (such as logical operations including maximum, minimum, greater than, etc.) can still be performed on the values. User privacy may also be protected by inserting additional false data items with the other items of user data. In that case, a profiling service could not differentiate between encrypted items of data that were derived from genuine items of user data, and false data items that were added to further protect user privacy. In further embodiments, user privacy may be protected by encrypting user data with a private key instead of a public key.

One or more rules are generated to profile a user. A rule is any category or association for profiling a user. As used herein, the term "rule" or "rules" can mean one rule or more than one rule. Rules are referred to by the term "Y," with subsets of rules designated "$Y_i$." A set of more than one rule may be designated as follows:

$$Rule=<Y_1,Y_2,Y_3,\ldots>$$

In embodiments, rules for profiling a user are based on defined user profiles and relate to the characteristics of user data. For example, a user profile may be defined for a "high-end car shopper." The user profile (high-end car shopper) has a rule (Y) to satisfy in order to categorize a particular user under a particular profile (a "high-end car shopper"). A user may be profiled by virtue of possessing one or more particular items of user data, or keywords, that satisfy one or more rules. As used herein, a keyword is an item of user data that includes one or more terms which satisfy one or more rules. For instance, if a user enters three search queries for the term "luxury car" and two search queries for the term "dealership," a rule may be satisfied that profiles the user as a "high-end car shopper." In this example, search queries for the keyword terms "luxury car" and "dealership" are items of private user data (W) that are used to profile the user. This first rule may be summarized as "$Y_1$=3×(luxury car)+2×(dealership)." A second rule may be established for "economy car shopper," for which the rule requires a user to search twice for the term "fuel efficiency" and twice for the term "mileage." In that case, the "economy car shopper" rule may be summarized as "$Y_2$=2×(fuel efficiency)+2×(mileage)." Therefore, a subset of rules for "high-end car shopper" ($Y_1$) and "economy car shopper" ($Y_2$) may be designated as "Rule=<$Y_1$, $Y_2$>." It should be understood that a subset of rules (Rule=<$Y_1$, $Y_2$, $Y_3$, . . . >) may contain a single or multiple rules (Y) for profiling a user. It should also be understood that a rule (Y) may require a single item of user data (W), or any combination of user data items (W) to satisfy the rule. For instance, a single search for a single website may satisfy a rule (Y) that categorizes a user into a particular profile.

The rules are encrypted using a second key. In embodiments using the PEKS system to encrypt the rules, the second key is referred to as a "private key." As used herein, a private key refers to an encryption key that is related to the public key, but is not known to the user or a profiling service. A private key is designated as "$K_{PRIV}$." Because the private key that is used to encrypt the rules is not known to the user, the user cannot identify which rules will be applied to the user data during profiling. In embodiments, the private key is also not known to a profiling service, which can profile a user without being able to decrypt either the identity of the rules encrypted with a private key, or the content of the user data encrypted with the public key. As such, privacy is maintained during profiling.

Using the PEKS system to encrypt rules involves creating a corresponding trapdoor of each of the one or more rules using a private key. In embodiments, creating a trapdoor for a rule includes creating a trapdoor for the keywords that a rule requires. A trapdoor for a corresponding rule (Y) is designated by the term "$TW_Y$." A trapdoor enables a profiling service to test whether the encrypted items of user data ($X_w$) satisfy one or more encrypted rules. In embodiments, a profiling service searches encrypted items of user data for particular keywords that satisfy a rule (Y). As such, an encrypted rule may include more than one trapdoor to satisfy a rule which requires more than one keyword. For example, for encrypting the "luxury car shopper" rule, ($Y_1$=3×(luxury car)+2×(dealership)), trapdoors are created for the keywords "luxury car" and "dealership." A profiling service may still view the requirements "3×" and "2×" in order to determine when three instances of the term "luxury car" ("3×TW") and two instances of term "dealership" ("2×TW") appear. One or more trapdoors, created for a rule (Y) with a private key ($K_{PRIV}$), is designated as follows:

$$TW_Y=Enc(K_{PRIV},Y)$$

Based on creating corresponding trapdoors, an encrypted rule may be established for each of the rules by replacing each of the keywords for the one or more rules ($Y_i$) with a corresponding trapdoor ($TW_{Yi}$). For example, the encrypted version of the rule for "luxury car shopper" may appear as "3×TW+2×TW," with the trapdoors to the keywords encrypted such that the A set of one or more encrypted rules is referred to as "$E_{RULE}$," and may be designated as follows:

$$E_{RULE}=<TW_{Y1},TW_{Y2},TW_{Y3},\ldots>$$

User data privacy may be further protected by introducing a finite life span into trapdoors. As such, an encrypted rule created from a trapdoor may only be used to profile a user for a defined amount of time. For example, privacy is protected for a user profiled according to a rule that was encrypted with a now-expired trapdoor. In some embodiments, a finite lifespan for a trapdoor may be introduced into a time stamp on a keyword. In further embodiments, user data privacy is further protected by creating trapdoors that can only be used by a specific profiling service or company. For example, the encryption service may include the domain name of the profiling service or company in the trapdoor. As such, the user component may also encrypt the domain name with the keywords found in the user data.

The party that generates the rules for profiling a user may be the same or separate from the party that encrypts the rules. In one embodiment, an encryption service both generates the rules and encrypts the rules. Therefore, the rule-generating party and the encrypting party are the same party. An encryption service refers to any party that is capable of encrypting data. The encryption service sends a first key to a user, with which the user will encrypt the user's data. In embodiments using the PEKS system, the encryption service sends the user a "public key" ($K_{PUB}$) with which to encrypt the user's data. While sending the public key to the user, the encryption service establishes an encrypted version of the rules ($E_{RULE}$) with a second key not known to the user. In embodiments using the PEKS system, this second key is referred to as the "private key" ($K_{PRIV}$). The rules encrypted by the encryption service ($E_{RULE}$) are then communicated to a profiling service.

In other embodiments, the rule generator may be a separate party from the encryption service. For instance, a rule generator may define which rules ($Y_i$) are going to be used to profile a user. A rule generator refers to any party that generates or transmits rules for profiling a user. In order to maintain the privacy of a user with respect to the party that generates the rules, one or more rules ("RULE(S)") can first be generated by a rule-generating party and subsequently delivered to the encryption service that encrypts the rules using a private key ($K_{PRIV}$). The encryption service also delivers the public key ($K_{PUB}$) to the user. As such, an encryption service may enable later profiling of a user without revealing, to the user, the identity of the party that generated the rules.

In further embodiments, the rule-generating party may encrypt the rules for a first time with a second private key ($K_{PRIV2}$), and then communicate the encrypted rules ($E_{RULE(i)}$) to the encryption service that encrypts the rules for a second time using the private key ($K_{PRIV}$). The rules encrypted by the encryption service ($E_{RULE}$) are then communicated to a profiling service. In this example, the encryption service may be any party not owned or operated by a rule generator or profiling service. To guarantee privacy further, the rule generating party may generate a first part of a public key ($K_{PUB(i)}$), which is then communicated to the encryption service that uses the first part of the public key to generate the completed version of the public key ($K_{PUB}$). In embodiments, using the PEKS system to encrypt user data with a public key separately from an encryption service encrypting the rules with a private key, enables the later profiling of the user while maintaining user privacy.

In embodiments where the user data is encrypted using a private key instead of a public key, the user component receives a private key from a third party. This third party private key is not known to the encryption service. As such, the user data is encrypted using a private key, and the rules are encrypted using a different private key. In such a system, a profiling service may use a public key to profile a user with user data encrypted with one private key, and rules encrypted with a different private key.

A profiling service matches the encrypted user data with the encrypted rules to create a profile for the user. As used herein, a profiling service is any service that profiles a user. A user profile may subsequently be used to provide personalized content delivery. A user profile is a pre-determined profile or segment that a user is categorized into based on a variety of types of user data. Matching the encrypted user data with the encrypted rules may be done using a pairwise function. In embodiments, the PEKS bilinear function is used by the profiling service to calculate whether an encrypted rule matches an encrypted item of user data. For example, because the public key and private key are related in the PEKS system, a profiling service can match encrypted user data ($X_W$) that was encrypted using a public key ($K_{PUB}$), with encrypted rules ($E_{RULE}=<TW_{Y1}, TW_{Y2}, TW_{Y3}, \ldots >$) that were encrypted using a private key ($K_{PRIV}$). When an encrypted item of user data ($X_W$) matches one or more trapdoors ($TW_n$) from an encrypted set of rules ($E_{RULE}$), a rule (Y) may be satisfied which profiles the user into a particular category. In embodiments, "matching" one or more trapdoors with one or more encrypted rules includes 1) determining whether a trapdoor matches a keyword found in the user data, and 2) performing an additional logical or mathematical operation to determine whether the rule has been satisfied. A profiling service may first check to see whether the encrypted user data matches one or more trapdoors created for a rule. The profiling service may then check to see if the number of occurrences of that particular item of encrypted data is satisfied. For example, a profiling service may first look to see if the encrypted item of data matches a first trapdoor "TW." Next, after determining that the item of data is present, the profiling service will look to see how many instances of the particular "TW" are present, such that the rule is satisfied. In embodiments that require three instances of the keyword, such that the rule "3×TW" is satisfied, the rule will not be used to profile the user until the profiling service successfully matches three instances of the required "TW." Profiling using such matching may be designated as follows:

$$e(X_W, TW_Y)$$

In embodiments, privacy is preserved for both the user data (W) and the rules (Y) because both the encrypted user data ($X_W$) and the trapdoors ($TW_n$) for the rules remain encrypted during profiling. As such, the profiling service may test the user data for the presence of keywords that satisfy rules for user profiles. In addition to profiling a user without disclosing the content of the user data, privacy is also preserved during profiling in embodiments where the application encrypting the user data is separate from the application encrypting the rules. In further embodiments, a profiling service that receives encrypted user data from one party, and receives encrypted rules from a different party, can use the PEKS system to profile the user without revealing the content or identity of either the encrypted user data or the encrypted rules.

Accordingly, in one aspect, an embodiment of the present invention is directed to one or more computer-readable media storing computer-useable instructions that, when used by one or more computing devices, causes the one or more computing devices to perform a method. The method includes receiving, from a first device, one or more rules for profiling a user, wherein the one or more rules were encrypted using a private key. The method also includes receiving, from a second device, user data, wherein the user data was encrypted using a public key communicated to the second device by the first device. The method further includes matching the encrypted one or more rules with the encrypted user data. The method still further includes, based on matching the encrypted user data with the encrypted one or more rules, generating a profile for the user.

In another embodiment, an aspect of the invention is directed to a computer system executed by one or more computer processors. The system includes a receiving component for receiving user data, wherein the receiving component encrypts the user data using a public key. The system also includes an encryption component for encrypting one or more rules for profiling a user, wherein the encryption component encrypts the one or more rules using a private key and communicates the public key to the user. The system further includes a profiling component for profiling a user, wherein the profiling component matches encrypted user data with the encrypted one or more rules using a pairwise function.

A further embodiment of the present invention is directed to one or more computer-readable media storing computer-useable instructions that, when used by one or more computing devices, causes the one or more computing devices to perform a method. The method includes receiving, from a first device, one or more encrypted rules for profiling a user, wherein the one or more rules were generated by the first device based on one or more profile definitions created by the first device and encrypted by the first device using a private key to create trapdoors for the one or more rules that were being encrypted. The method also includes receiving, from a second device, encrypted user data from a user, wherein the user data was encrypted using a random number and a public key communicated to the second device by the first device. The method further includes matching the one or more encrypted rules with the encrypted user data using a pairwise function. The method still further includes, based on matching the encrypted user data with the encrypted rules, generating a profile for the user.

Figure 1:
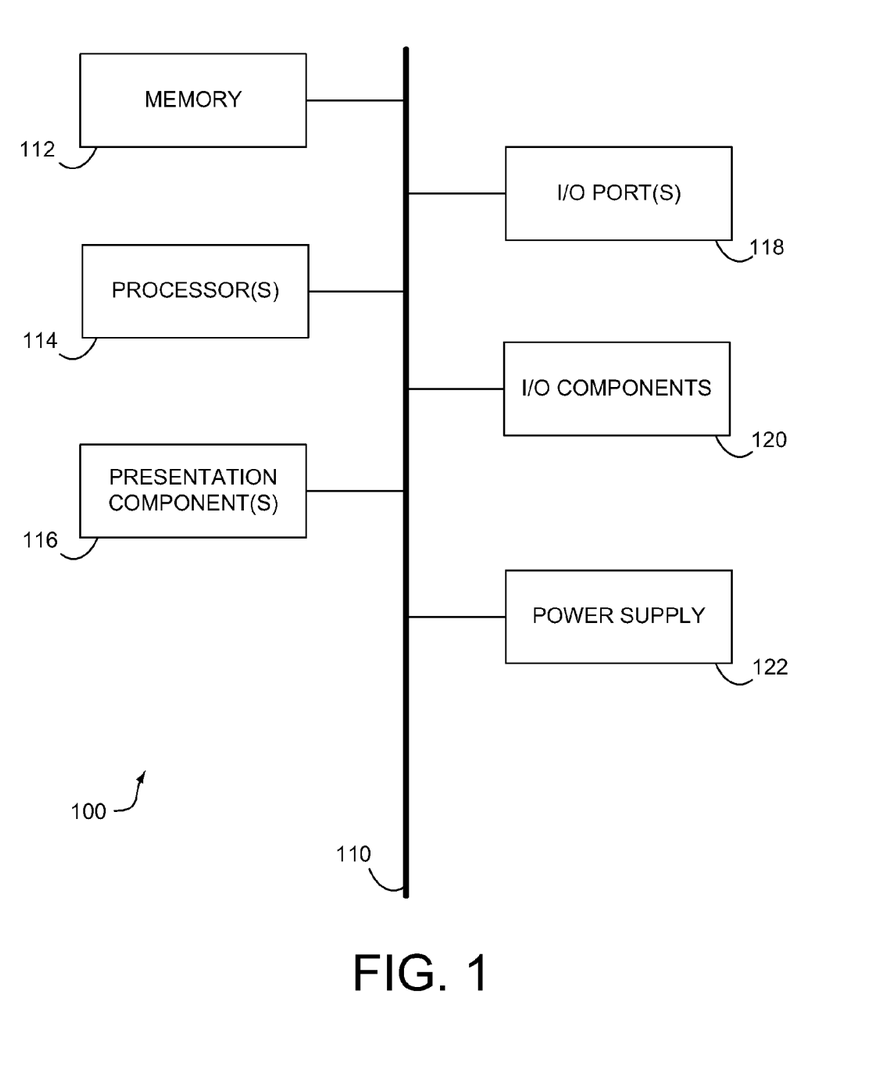
FIG. 1 is a an exemplary computing environment suitable for use in implementing embodiments of the present invention.

Having briefly described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, these blocks represent logical, not necessarily actual, components. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media implemented in any method or technology for storage of information such as computer-readable instructions, data structures, program modules or other data. Computer-readable media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Combinations of any of the above should also be included within the scope of computer-readable media.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
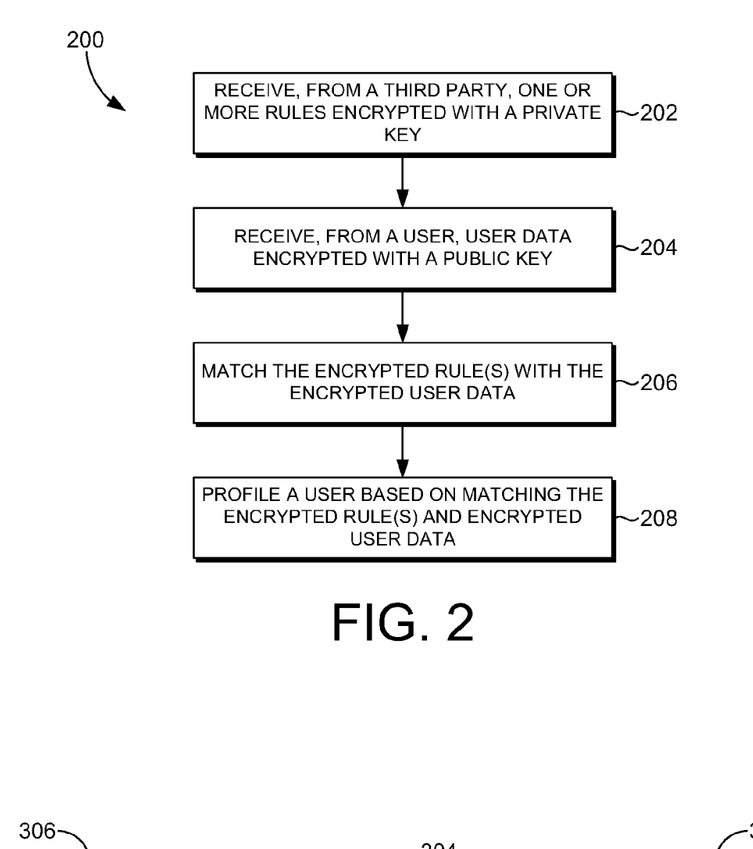
FIG. 2 is a flow diagram showing a method for maintaining privacy during user profiling.

As indicated previously, embodiments of the present invention are directed to maintaining privacy during user profiling. Referring now to FIG. 2, a flow diagram illustrates a method 200 for maintaining privacy during user profiling in accordance with an embodiment of the present invention. Initially, as shown at block 202, a profiling service receives, from a third party, one or more rules encrypted with a private key. That is, one or more rules for profiling a user are encrypted using a private key and communicated to the profiling service. The rule(s) may define a single or multiple profiles, and may pertain to a single or multiple users.

As shown at block 204, the profiling service receives user data encrypted with a public key. In embodiments, the user receives the public key from the same third party that communicated the rules to the profiling service. In other embodiments, the user receives the public key from an encryption service that encrypts rules received from a rule generator, and communicates the encrypted rules to the profiling service. In further embodiments, the user receives the public key from a trusted party that generated the public key based on a first part of a public key received from a rule generator. The user then encrypts the user data using the public key and a random number.

At block 206, the profiling service matches the encrypted rules with the encrypted user data. As used herein, matching the encrypted rules with the encrypted user data refers to associating one or more encrypted rules with one or more items of encrypted data. The matching may be performed using a pairwise matching. In embodiments, the matching is performed using the PEKS bilinear function. This matching correlates the encrypted rules with the encrypted user data, without decrypting either the rules or the user data.

As shown at block 208, a profile is established for a user based on matching the encrypted rules with the encrypted user data. This profile may be defined by satisfying the encrypted rules. For instance, an encrypted rule may dictate that a user who searches three times for the term "luxury car," and twice for the term "dealership," is then profiled as a "high-end car shopper." In embodiments, a single item of user data may not satisfy the entire rule, such as, for instance, a single search for the term "luxury car." This single search for the term "luxury car" may be recognized by the profiling service upon matching an encrypted keyword with the corresponding trapdoor. A user may be "marked" after a single search for the term "luxury car," such that the profiling service can continue to evaluate other items of digital content to determine whether the remaining requirements of the rule are satisfied. After the user searches for "luxury car" two more times, and searches twice for "dealership," the conditions are satisfied for the rule, and the user is profiled as a "high-end car shopper." In embodiments where both the trapdoors of the rules and the user data is encrypted using the PEKS system, the profiling service can match the encrypted rules to the trapdoor of the encrypted user data without seeing the content of either the rule or the user data. As can be appreciated, a profile can be established by applying any number of rules or sets of rules when matching the encrypted rules and the encrypted user data.

Figure 3:
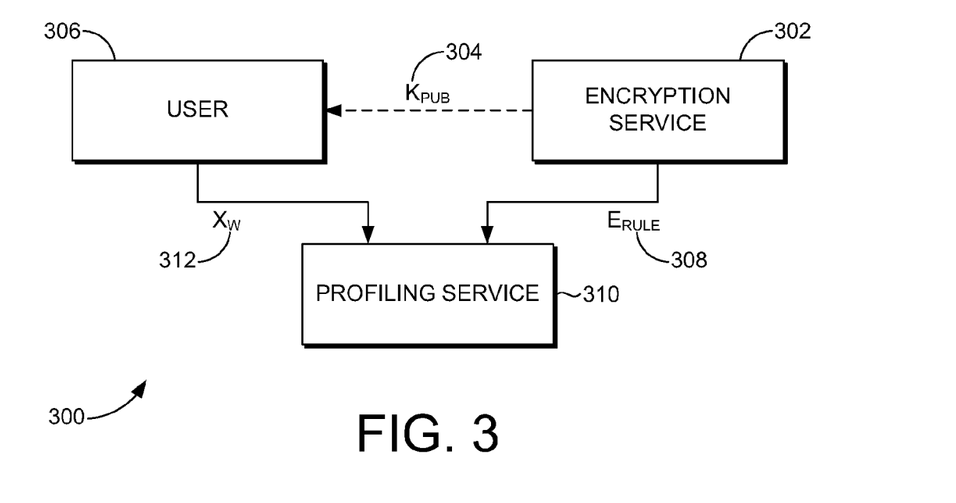
FIGS. 3-5 are exemplary systems in which embodiments may be employed for maintaining privacy during user profiling.

Among other components not shown, as illustrated in FIG. 3, an exemplary computing system 300 generally includes an encryption service 302, a user component 306, and a profiling service 310. The encryption service 302, user component 306, and profiling service 310 may each be executed by a separate computing device, such as computing device 100 described with reference to FIG. 1, for example. Alternatively, the components may be separate applications executed by one or two computing devices. The components of the system 300 may communicate with each other via a network, which may include, without limitation, one or more local area networks (LANs) and/or wide area networks (WANs). Such networking environments are commonplace in offices, enterprise-wide computer networks, intranets, and the Internet. It should be understood that any number of rule generators, users, and profiling services may be employed within the system 300 within the scope of the present invention. Each may comprise a single device or multiple devices cooperating in a distributed environment. For instance, the encryption service 302 may comprise multiple devices arranged in a distributed environment that collectively provide the functionality of the encryption service 302 described herein. Additionally, other components not shown may also be included within the system 300.

Generally, the system 300 illustrates an environment in which the encryption service 302 generates rules for profiling a user. The encryption service 302 may be any number of different types of components, including an individual device or an application within a computer processor. By way of example only, and not limitation, the encryption service may be the owner of a search engine or webpage. In one embodiment, the encryption service 302 generates one or more rules for profiling a user. Using the PEKS system, the encryption service 302 communicates the public key 304 ($K_{PUB}$) to the user component 306. The encryption service 302 also uses a private key to encrypt the rules, and communicates the encrypted rules ($E_{RULE}$) 308 to profiling service 310. Having received the public key 304 from the encryption service 302, the user component 306 encrypts the user data and communicates the encrypted user data ($X_W$) 312 to the profiling service 310. The profiling service 310 uses the PEKS system to profile the user by matching the encrypted user data 312 with the encrypted rules 308. Various functions described herein as being performed by one or more entities may be carried out by hardware, firmware, and/or software. For instance, various functions may be carried out by a processor executing instructions stored in memory.

Figure 4:
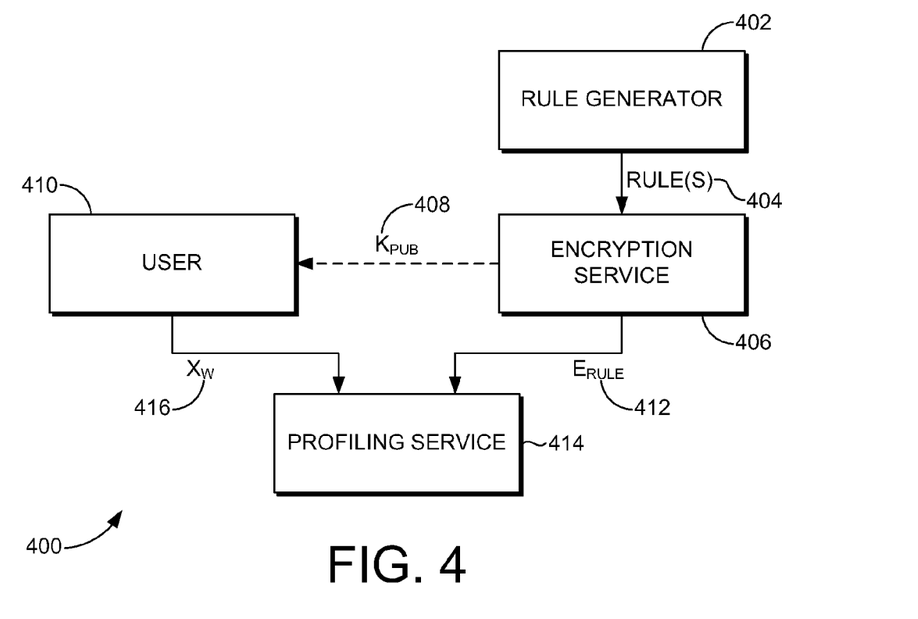

Referring next to FIG. 4, an exemplary computing system 400 generally includes a rule generator 402, an encryption service 406, a user component 410, and a profiling service 414. The rule generator 402, encryption service 406, user component 410, and profiling service 414 may each be executed by a separate computing device, such as computing device 100 described with reference to FIG. 1, for example. Alternatively, the components may be separate applications executed by one or two computing devices. The components of the system 400 may communicate with each other via a network, which may include, without limitation, one or more local area networks (LANs) and/or wide area networks (WANs). Such networking environments are commonplace in offices, enterprise-wide computer networks, intranets, and the Internet. It should be understood that any number of rule generators, encryption services, users, and profiling services may be employed within the system 400 within the scope of the present invention. Each may comprise a single device or multiple devices cooperating in a distributed environment. For instance, the rule generator 402 may comprise multiple devices arranged in a distributed environment that collectively provide the functionality of the rule generator described herein. Additionally, other components not shown may also be included within the system 400.

Generally, the system 400 illustrates an environment in which the rule generator 402 generates rules for profiling a user. As used herein, a rule generator is any source that produces one or more rules. The rule generator 402 may be any number of different types of components, including an individual device or an application within a computer processor. By way of example only, and not limitation, the rule generator 402 may be the owner of a search engine or webpage. In one embodiment, the rule generator 402 generates one or more rules 404 for profiling a user. The rule generator 402 communicates the rules 404 to the encryption service 406. As used herein, an encryption service is any service used to encrypt data. In embodiments, as distinct from a rule generator that generates one or more rules, an encryption service receives one or more rules to encrypt. For example, an encryption service may receive and encrypt rules for profiling a user. In embodiments, the encryption service receives rules generated by a rule generator and encrypts the rules using a private key from the PEKS system.

Using the PEKS system, the encryption service 406 communicates the public key 408 to the user component 410. The encryption service 406 also uses a private key to encrypt the rules 404, and communicates the encrypted rules 412 to profiling service 414. Having received the public key 408 from the encryption service 406, the user component 410 encrypts the user data and communicates the encrypted user data 416 to the profiling service 414. The profiling service 414 uses the PEKS system to profile the user by matching the encrypted user data 416 with the encrypted rules 412. Various functions described herein as being performed by one or more entities may be carried out by hardware, firmware, and/or software. For instance, various functions may be carried out by a processor executing instructions stored in memory. Further, because user component 410 received the public key 408 from encryption service 406, profiling service 414 is able to profile a user without revealing, to the user, the identity of the party that generated the rules. Therefore, the identity of rule generator 402 may remain unknown to user component 410.

Figure 5:
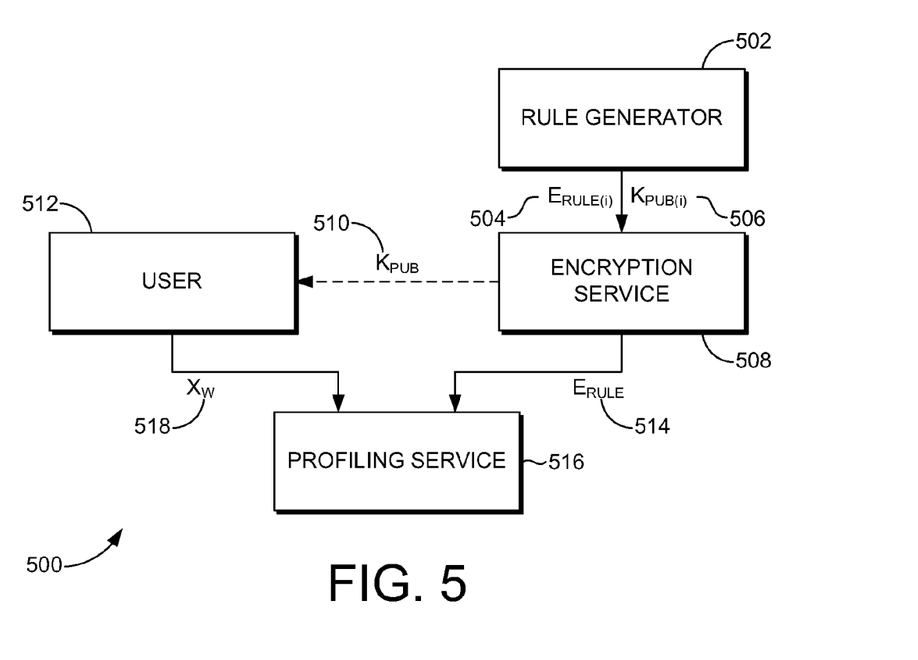

With reference now to FIG. 5, an exemplary computing system 500 generally includes a rule generator 502, an encryption service 508, a user component 512, and a profiling service 516. The rule generator 502, encryption service 508, user component 512, and profiling service 516 may each be executed by a separate computing device, such as computing device 100 described with reference to FIG. 1, for example. Alternatively, the components may be separate applications executed by one or two computing devices. The components of the system 500 may communicate with each other via a network, which may include, without limitation, one or more local area networks (LANs) and/or wide area networks (WANs). Such networking environments are commonplace in offices, enterprise-wide computer networks, intranets, and the Internet. It should be understood that any number of rule generators, encryption services, users, and profiling services may be employed within the system 500 within the scope of the present invention. Each may comprise a single device or multiple devices cooperating in a distributed environment. For instance, the rule generator 502 may comprise multiple devices arranged in a distributed environment that collectively provide the functionality of the rule generator described herein. Additionally, other components not shown may also be included within the system 500.

Generally, the system 500 illustrates an environment in which the rule generator 502 generates rules for profiling a user. The rule generator 502 may be any number of different types of components, including an individual device or an application within a computer processor. By way of example only, and not limitation, the rule generator may be the owner of a search engine or webpage. In one embodiment, the rule generator 502 generates one or more rules for profiling a user. Using the PEKS system, the rule generator 502 encrypts the rules using a second private key, and communicates the encrypted rules 504 to an encryption service 508. The rule generator 502 also generates a first part of a public key 506, and communicates the first part of the public key 506 to the encryption service 508. In this embodiment, an encryption service may be any third party not owned or operated by the same party that owns or operates either a rule generator 502 and a profiling service. For example, if the rule generator 502 and the profiling service 516 are both owned by a single party, an encryption service 508 not owned by the single party may be used to encrypt the rules and generate a public key such that the single party is not aware of either the public key 510 or the encrypted rules 514.

The encryption service 508 generates the public key from the first part of the public key 506 received from the rule generator 502. The encryption service then communicates the completed public key 510 to the user component 512. Using the PEKS system, the encryption service 508 encrypts the encrypted rules 504 using the private key, and generates the final encrypted rules 514. The encryption service 508 communicates the encrypted rules 514 to the profiling service 516. Having received the public key 510 from the encryption service 508, the user component 512 encrypts the user data and communicates the encrypted user data 518 to the profiling service 516. The profiling service 516 uses the PEKS system to profile the user by matching the encrypted user data 518 with the encrypted rules 514. Various functions described herein as being performed by one or more entities may be carried out by hardware, firmware, and/or software. For instance, various functions may be carried out by a processor executing instructions stored in memory. Further, because user component 512 received the public key 510 from encryption service 508, profiling service 516 is able to profile a user without revealing, to the user, the identity of the party that generated the rules. Therefore, the identity of rule generator 502 remains unknown to user component 512. User privacy is protected by profiling a user with encrypted rules 514 that were encrypted a first time by rule generator 502, and a second time by encryption service 508. Providing even more security to a user that has been profiled, public key 510 was generated by encryption service 508 after having a first part of the public key 506 created by rule generator 502.

A user may be profiled while maintaining user privacy in a variety of ways. For illustrative purposes only, FIGS. 6-8 include exemplary flow diagrams for a method of maintaining privacy during user profiling. It will be understood and appreciated by those of ordinary skill in the art that the flow diagrams of FIGS. 6-8 are provided by way of example only and are not intended to limit the scope of the present invention in any way.

Figure 6:
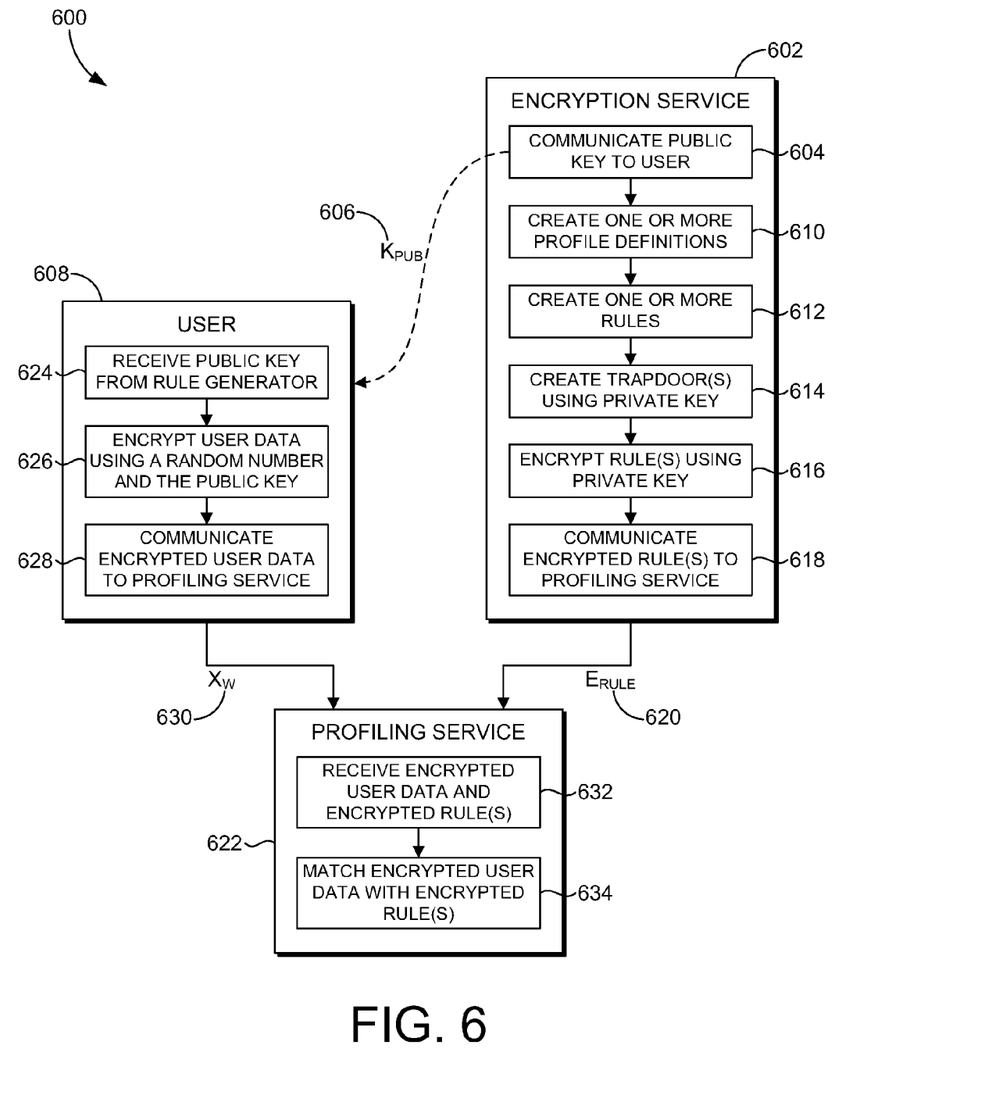
FIGS. 6-8 are illustrative flow diagrams showing methods for maintaining privacy during user profiling.

With reference initially to FIG. 6, a flow diagram illustrates a method 600 for maintaining privacy during user profiling in accordance with an embodiment of the present invention. The method includes encryption service 602, user component 608, and profiling service 622. It should be understood that method 600 may comprise multiple encryption services, user components, and profiling services that collectively perform the same steps as those depicted in method 600. Initially, as shown at block 604, the encryption service 602 communicates a public key 606 to the user component 608. The encryption service then creates one or more profile definitions at block 610. A profile definition is a defined set of user data (W) characteristics from which to create a rule for profiling a user. For example, a profile definition for a "high-end car shopper" user profile includes such user data (W) characteristics as search engine queries for "luxury car" and "dealership." As shown at block 612, the encryption service creates one or more rules for profiling a user based on the profile definitions established at block 610. For example, a rule for "high-end car shopper" may require three searches for the term "luxury car" and two searches for the term "dealership." Such a rule may be characterized as "Y=3×(luxury car)+2×(dealership)." At block 614, the encryption service creates trapdoors for the rules. The trapdoors are created for the keywords that satisfy the rule. For example, trapdoors may be created for the keywords "luxury car" and "dealership." The encryption service then encrypts the rules, using a private key, at block 616. For example, the encrypted rule replaces the keywords with trapdoors, such that a rule may be presented at "Y=3×(TW)+2×(TW)." The encrypted rules ($E_{RULE}$) 620 are communicated by the encryption service 602 at block 618 to the profiling service 622. The user component 608 receives the public key ($K_{PUB}$) 606 from the encryption service 602 at block 624. At block 626, the user component 608 encrypts the user data using a random number and the public key 606. The user component 608 then communicates the encrypted user data ($X_W$) 630 to profiling service 622 at block 628. The profiling service 622 receives the encrypted user data 630 and the encrypted rules 620 at block 632. At block 634, the profiling service 622 matches the encrypted user data 630 with the encrypted rules 620, such as by using the PEKS bilinear function. User privacy is protected by profiling a user without the need to decrypt either the encrypted user data 630 or the encrypted rules 620. Additionally, in embodiments where profiling service 622 does not have access to the private key used at block 614, the privacy of user data is further protected.

Figure 7:
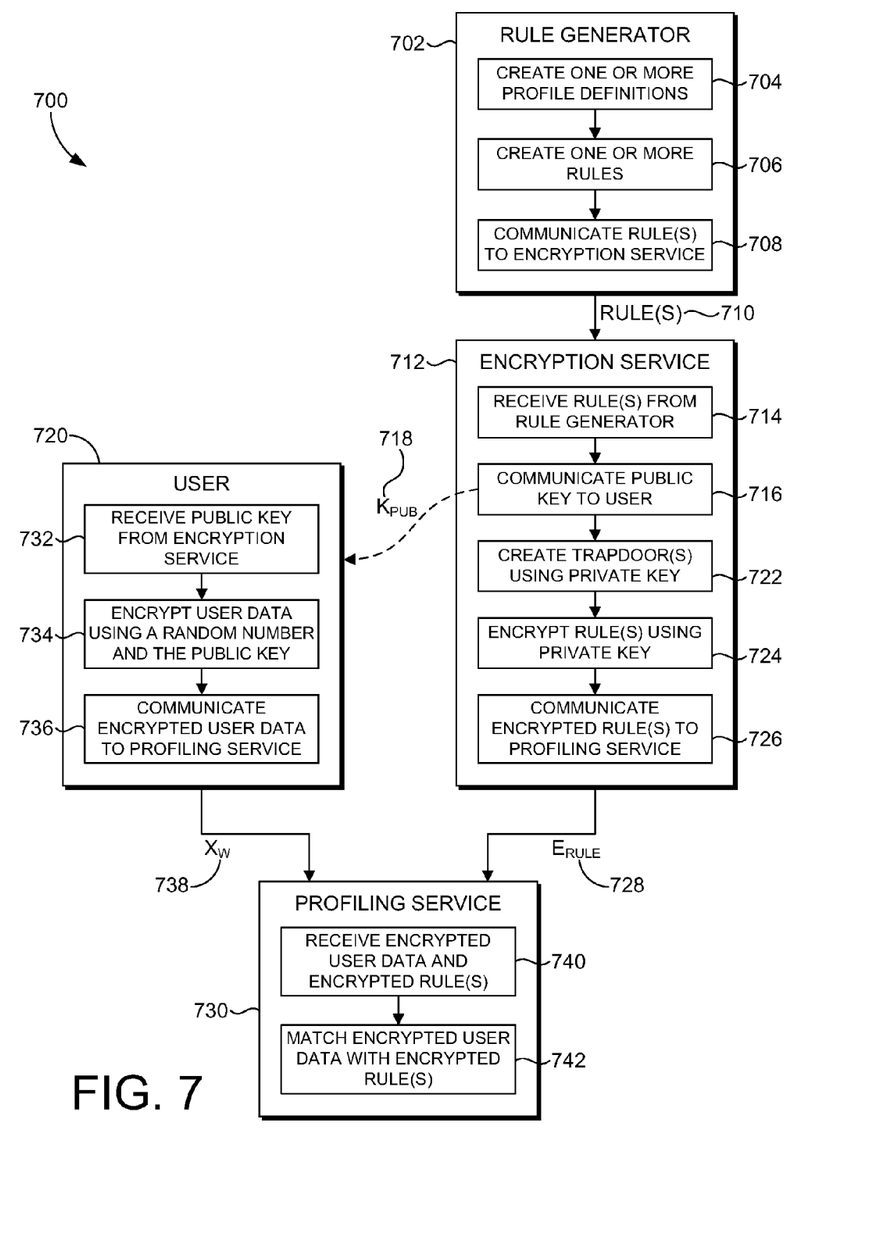

As shown in FIG. 7, a flow diagram illustrates a method 700 for maintaining privacy during user profiling in accordance with an embodiment of the present invention. The method includes rule generator 702, encryption service 712, user component 720, and profiling service 730. It should be understood that method 700 may comprise multiple rule generators, encryption services, users, and profiling services that collectively perform the same steps as those depicted in method 700. Initially, as shown at block 704, the rule generator 702 creates one or more profile definitions. A profile definition is a defined set of user data (W) characteristics from which to create a rule for profiling a user. For example, a profile definition for a "high-end car shopper" user profile includes such user data (W) characteristics as search engine queries for "luxury car" and "dealership." As shown at block 706, the rule generator creates one or more rules for profiling a user based on the profile definitions established at block 704. For example, a rule for "high-end car shopper" may require three searches for the term "luxury car" and two searches for the term "dealership." Such a rule may be characterized as "Y=3×(luxury car)+2×(dealership)." The rule generator 702 creates one or more rules at step 706, and communicates the rules (RULE(S)) 710 to the encryption service 712 at block 708. The encryption service 712 receives the rules from the rule generator 702 at block 714. As shown at block 716, the encryption service then communicates the public key 718 ($K_{PUB}$) to user component 720. At block 722, the encryption service creates trapdoors using a private key. The encryption service 712 then encrypts the rules using a private key at block 724 and communicates the encrypted rules ($E_{RULE}$) 728 to the profiling service 730 at block 726. User component 720 receives the public key 718 from the encryption service 712 at block 732. At block 734, user component 720 encrypts the user data using a random number and the public key 718. The encrypted user data ($X_W$) 738 is communicated to the profiling service 730 by the user component 720 at block 736. The profiling service 730 receives the encrypted user data 738 and the encrypted rules 728 at block 740. At block 742, the profiling service 730 matches the encrypted user data 738 with the encrypted rules 728, such as by using the PEKS bilinear function. Because user component 720 received the public key 718 from encryption service 712, profiling service 730 is able to profile a user without revealing, to the user, the identity of the party that generated the rules. Therefore, the identity of rule generator 702 may remain unknown to user component 720. Additionally, in embodiments where rule generator 702 and profiling service 730 do not have access to the private key used by encryption service 712, user privacy is further protected.

Figure 8:
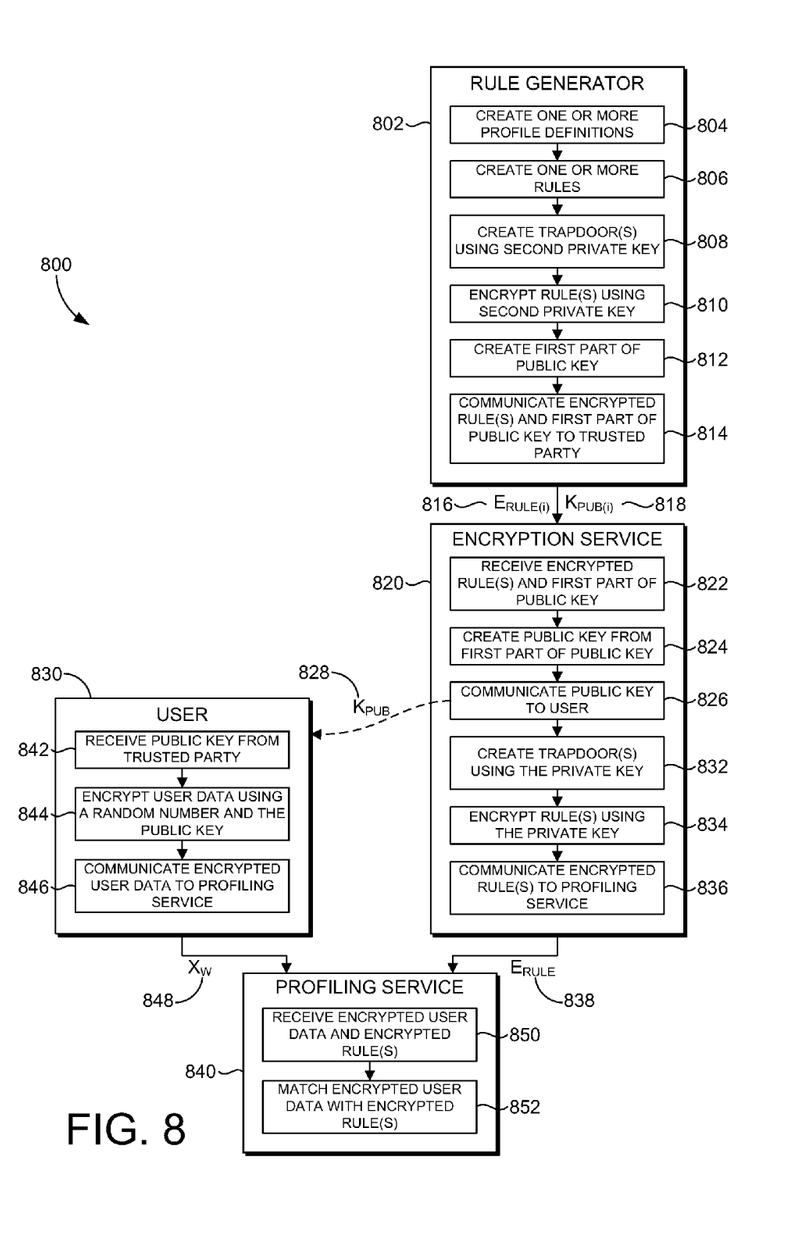

Finally, referring now to FIG. 8, a flow diagram illustrates a method 800 for maintaining privacy during user profiling in accordance with an embodiment of the present invention. The method includes rule generator 802, encryption service 820, user component 830, and profiling service 840. It should be understood that method 800 may comprise multiple rule generators, encryption services, user components, and profiling services that collectively perform the same steps as those depicted in method 800. Initially, as shown at block 804, the rule generator 802 creates one or more profile definitions. A profile definition is a defined set of user data (W) characteristics from which to create a rule for profiling a user. For example, a profile definition for a "high-end car shopper" user profile includes such user data (W) characteristics as search engine queries for "luxury car" and "dealership." As shown at block 806, the rule generator creates one or more rules for profiling a user based on the profile definitions established at block 804. For example, a rule for "high-end car shopper" may require three searches for the term "luxury car" and two searches for the term "dealership." Such a rule may be characterized as "Y=3×(luxury car)+2×(dealership)." The rule generator 802 then creates trapdoors using a second private key at block 808. Based on the trapdoors, the rule generator 802 encrypts the rules ($E_{RULE(i)}$) block 810 using a second private key. At block 812 the rule generator 802 creates a first part of a public key ($K_{PUB(i)}$). The rule generator 802 then communicates the encrypted rules 816 and the first part of the public key 818 to the encryption service 820 at block 814.

At block 822, the encryption service 820 receives the encrypted rules 816 and the first part of the public key 818 from the rule generator 802. At shown at block 824, the encryption service 820 creates the public key 828 ($K_{PUB}$) from the first part of the public key 818 ($K_{PUB(i)}$). The encryption service communicates the public key 828 to the user component 830 at block 826. The encryption service then creates trapdoors using the private key at block 832 and encrypts rules using the private key at block 834. As shown at block 836, the encryption service communicates the encrypted rules ($E_{RULE}$) 838 to the profiling service 840. The user component 830 receives the public key 828 from the encryption service 820 at block 842. At block 844, the user component 830 encrypts user data using a random number and the public key 828. As shown at block 846, the user component 830 communicates the encrypted user data ($X_W$) 848 to the profiling service 840. The profiling service 840 receives the encrypted user data 848 and the encrypted rules 838 at block 850. At block 852, the profiling service 840 matches the encrypted user data 848 with the encrypted rules 838, such as by using the PEKS bilinear function. Because user component 830 received the public key 828 from encryption service 820, profiling service 840 is able to profile a user without revealing, to the user, the identity of the party that generated the rules. Therefore, the identity of rule generator 802 may remain unknown to user component 830. Additionally, user privacy is protected in method 800 by profiling a user with encrypted rules 838 that were encrypted for a first time by rule generator 802, and a second time by encryption service 820. Providing even more security to a user that has been profiled, public key 828 was generated by encryption service 820 after having a first part of the public key 818 created by rule generator 802. As such, even if a rule generator 802 and a profiling service 840 are owned by the same party, the user profile generated by profiling service 840 cannot be used to identify the content of the user's data. Further, the user profile generated based on encrypted rules 838 provides additional protection to the user data when only the encryption service 820 has access to the private key used in block 832.

As can be understood, embodiments of the present invention maintain privacy during user profiling. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer-readable device storing computer-useable instructions that, when used by one or more computing devices, causes the one or more computing devices to perform a method, the method comprising:
   receiving, from a first device, one or more rules for profiling a user, where the one or more rules were encrypted using a private key, where encrypting the one or more rules using a private key comprises creating one or more corresponding trapdoors for each of the one or more rules using a private key and building an encrypted rule for each of the one or more rules by replacing each of the one or more rules with the one or more corresponding trapdoors;
   receiving, from a second device, user data, where the user data was encrypted using a public key and a random number communicated to the second device by the first device;
   matching the encrypted one or more rules with the encrypted user data; and
   based on the matching the encrypted one or more rules with the encrypted user data, generating a profile for the user.

2. The one or more computer-readable device of claim 1, wherein the first device generates the one or more rules for profiling a user based on user profile definitions.

3. The one or more computer-readable device of claim 1, wherein generating a profile for the user comprises matching the one or more trapdoors of the encrypted rules with the encrypted user data using a pairwise function.

4. The one or more computer-readable device of claim 1, wherein the one or more corresponding trapdoors for each of the one or more rules has one or more of a finite lifespan and a defined domain name associated with the one or more corresponding trapdoors.

5. The one or more computer-readable device of claim 1, wherein the first device received the one or more rules from a third device that generated the one or more rules.

6. The one or more computer-readable device of claim 5, wherein the third device encrypts the one or more rules using a second private key and the first device encrypts the one or more rules using the private key.

7. The one or more computer-readable device of claim 6, wherein the first device generates the public key based on a first part of the public key received from the third device.

8. The one or more computer-readable device of claim 1, wherein the user data is encrypted using the public key by encrypting a data label of the user data and keeping a value of the user data clear.

9. The one or more computer-readable device of claim 1, wherein the method further comprises receiving false data values with the user data received from the second device.

10. One or more computer-readable device storing computer-useable instructions that, when used by one or more computing devices, causes the one or more computing devices to perform a method, the method comprising:
receiving, from a first device, one or more encrypted rules for profiling a user, where the one or more rules were generated by the first device based on one or more profile definitions created by the first device and encrypted by the first device using a private key to create trapdoors for the one or more rules that were being encrypted;
receiving, from a second device, encrypted user data from a user, where the user data was encrypted using a random number and a public key communicated to the second device by the first device;
matching the one or more encrypted rules with the encrypted user data using a pairwise function; and
based on the matching the one or more encrypted rules with the encrypted user data, generating a profile for the user.

11. A method executed by one or more computing devices, the method comprising:
receiving, from a first device, one or more rules for profiling a user, where the one or more rules were encrypted using a private key, where encrypting the one or more rules using a private key comprises creating one or more corresponding trapdoors for each of the one or more rules using a private key and building an encrypted rule for each of the one or more rules by replacing each of the one or more rules with the one or more corresponding trapdoors;
receiving, from a second device, user data, where the user data was encrypted using a public key and a random number communicated to the second device by the first device;
matching the encrypted one or more rules with the encrypted user data; and
based on the matching the encrypted one or more rules with the encrypted user data, generating a profile for the user.

12. The method of claim 11, wherein the first device generates the one or more rules for profiling a user based on user profile definitions.

13. The method of claim 11, wherein generating a profile for the user comprises matching the one or more trapdoors of the encrypted rules with the encrypted user data using a pairwise function.

14. The method of claim 11, wherein the one or more corresponding trapdoors for each of the one or more rules has one or more of a finite lifespan and a defined domain name associated with the one or more corresponding trapdoors.

15. The method of claim 11, wherein the first device received the one or more rules from a third device that generated the one or more rules.

16. The method of claim 15, wherein the third device encrypts the one or more rules using a second private key and the first device encrypts the one or more rules using the private key.

17. The method of claim 16, wherein the first device generates the public key based on a first part of the public key received from the third device.

18. The method of claim 11, wherein the user data is encrypted using the public key by encrypting a data label of the user data and keeping a value of the user data clear.

19. The method of claim 11, wherein the method further comprises receiving false data values with the user data received from the second device.

20. A method executed by one or more computing devices, the method comprising:
receiving, from a first device, one or more encrypted rules for profiling a user, where the one or more rules were generated by the first device based on one or more profile definitions created by the first device and encrypted by the first device using a private key to create trapdoors for the one or more rules that were being encrypted;
receiving, from a second device, encrypted user data from a user, where the user data was encrypted using a random number and a public key communicated to the second device by the first device;
matching the one or more encrypted rules with the encrypted user data using a pairwise function; and
based on the matching the one or more encrypted rules with the encrypted user data, generating a profile for the user.

* * * * *